US005459607A

United States Patent [19]
Fellows et al.

[11] Patent Number: 5,459,607
[45] Date of Patent: Oct. 17, 1995

[54] SYNCHRONOUS OPTICAL DIGITAL TRANSMISSION SYSTEM AND METHOD

[75] Inventors: Richard L. Fellows, Pleasanton; Thomas B. Reynolds, Los Altos, both of Calif.

[73] Assignee: C-Cor/Comlux, Inc., Freemont, Calif.

[21] Appl. No.: 49,270

[22] Filed: Apr. 19, 1993

[51] Int. Cl.⁶ .................................................. H04L 7/00
[52] U.S. Cl. ...................... 359/138; 359/158; 375/356; 370/100.1
[58] Field of Search ..................... 359/135, 136, 359/158, 138; 370/100.1, 105.3, 108; 371/47.1, 48; 375/107, 108, 109, 111, 120

[56] References Cited

U.S. PATENT DOCUMENTS

| | | | |
|---|---|---|---|
| 4,847,831 | 7/1989 | Spiesman et al. | 359/158 |
| 4,912,706 | 3/1990 | Eisenberg et al. | 375/109 |
| 5,052,028 | 9/1991 | Zwack | 375/109 |
| 5,062,124 | 10/1991 | Hayashi et al. | 375/107 |
| 5,241,543 | 8/1993 | Amada et al. | 370/100.1 |

*Primary Examiner*—Robert Raevis
*Assistant Examiner*—Richard A. Moller
*Attorney, Agent, or Firm*—Edward Dreyfus

[57] ABSTRACT

A synchronous optical digital transmission system comprises a local interface unit having a phase locked loop circuit that senses and adjusts the phase of the clock signals arriving from the remote unit to match the phase of the principal or local clock so that arriving data bit streams can be directly applied to the local system for further processing. The system is also designed to transmit and receive high speed and low speed data over a single fiber operating in a diplex mode without adverse crosstalk effects by employing non-standard line coding techniques.

11 Claims, 3 Drawing Sheets

SYNCHRONOUS OPTICAL DIGITAL TRANSMISSION SYSTEM AND METHOD

FIELD OF INVENTION

The present invention relates to digital fiber transmission systems and more particularly to synchronous fiber digital transmission systems.

BACKGROUND OF INVENTION

Certain digital transmission fiber systems require that the system be fully synchronous. In some instances where there is a source of digital information to be connected to the system from a remote station, a method is employed that sends a reference clocking signal to the remote station for the purpose of receiving synchronized data back from the remote station.

One of the problems experienced by conventional systems with this arrangement is that the delay path between the sending clock of the main unit out to the remote location and receiving data back at the main unit is long and dynamically changing due to changes in temperature which effects the equivalent and physical length of the fiber communication path. At present serial bit rates, there can be as much as several bits of variable delay associated with temperature induced changes in the length of fiber.

The standard method of correcting this problem involves the use of a first—in—first out (FIFO) apparatus in the return path so that associated information is maintained in the properly assigned bit locations for insertion into the digital transmission system.

However, this conventional method and apparatus is complex, requires many electronic components and is relatively expensive to employ.

It has been found that simultaneous bidirectional transmission of optical signals may be a desired technique leading to a better functional and cost based system for this application. However, such diplexing techniques of equal wavelength digital bit streams require the use of optical couplers to separate the optical signal information bits. Optical couplers provide a certain degree of optical isolation but reflections of standard non-return to zero (NRZ) line coded signals at the fiber interface will substantially degrade the detected signal to noise ratio.

Thus, in conventional NRZ transmission systems, the spectrum extends from a low frequency determined by the maximum run length of ones or zeros to a maximum frequency approaching the bit rate of the data stream. The low frequency components from the high speed data stream will degrade the signal to noise ratio of the low speed data stream and, conversely, the spectrum of the low speed data stream will contribute noise to the high speed data stream. The result will be errors in the data output. Accordingly, it would appear that use of optical couplers in a diplex mode, single fiber medium would have technical restrictions in the application to remote synchronous digital optical fiber systems.

SUMMARY OF THE INVENTION

It is an object of the present invention to provide a digital fiber synchronized transmission system that solves the forgoing problems and provides other and further advantages and employs a reliable and far less complex method and apparatus of the type described.

As further described below, the present invention includes a method and apparatus for dynamically adjusting the reference clock signal phase sent to the remote information source so that the data returned is synchronous with and properly phased for immediate insertion into the local or principal digital system.

More specifically, the dynamic phase adjustment method and apparatus according to the present invention includes using the local system principal clock signals to develop a clock reference signal which in turn is used to generate a low speed clock signal which is transmitted over an optical fiber medium to a remote location. There, the reference clock signal is multiplied to develop a high speed clock signal that controls the timing for the high speed information data bit stream transmitted back over the optical fiber. Upon arrival of the high speed bit stream, the data and high speed clock signals are separated, the data entering the local system for further processing and the high speed clock signals used for controlling the phase of the reference clock signals.

Since the high speed clock signals have just arrived from the transmission medium, i.e. the optical fiber, any changes in signal phase resulting from changes in the medium characteristics, such as from temperature changes, are cancelled out or adjusted relative to the reference clock signal described above. In this way, the data stream arriving from the remote location is phase-locked with the local or principal system clock.

Further according to another aspect of the invention, the transmission medium for the system of the type described comprises a single fiber operating in a diplex mode. Signal to noise ratio degradation and other interference due tic use of optical couplers or diplex mode transmission are reduced by shaping the spectrum of the transmitted optical data streams through the single fiber in the opposite directions. Thus the present invention uses a line code, different from the conventional NRZ line codes, that has a power curve that falls away quickly from the from the desired center or clock frequency. One such suitable code is a bi-phase or Manchester coding that yields a substantial improvement in received signal to noise ratio of both the low speed and high speed channels. In the case of the high speed channel, the high-frequency effects of the low speed signals are filtered out with very little degradation of the data waveshape, since there is very little energy in the low frequency region of the Manchester coded optical data stream.

In the case of the low speed channel, the noise contribution of the interfering high speed channel is quite low in the bandwidth of the low speed data signal because (i) the energy content is low because energy is falling off rapidly on the low frequency side of the spectrum and (ii) the power spectral density (PSD) of the high speed channel is low due to the high bit rate, i.e. the energy is spread over a large spectrum. Thus, a small fraction of the total energy in the interfering high speed channel actually contributes to the degradation of the low speed channel signal to noise ratio.

Accordingly, the present invention employs optical couplers in a diplex mode single fiber, synchronous digital transmission system with a remote data stream generating station without the expected signal to noise degradations mentioned above. Other and further aspects, objectives and benefits will become apparent from the following detailed description of an exemplary embodiment of the present invention when taken in light of the appended drawings, in which:

DRAWINGS

FIG. 1A–B shows a schematic drawing of one example of a system and method according to the present invention.

FIG. 2 is a graph (not intentionally drawn to scale) of the power-frequency spectrum and representing one example of the line code response curves, such as the low and high channel Manchester line coding curves for the system and method of FIG. 1. The Manchester curves are shown centered on the low and high speed clock Signal frequencies, respectively. The conventional NRZ response curves for the same high and low clock frequencies are also shown for comparison.

DETAILED DESCRIPTION OF EXEMPLARY EMBODIMENT OF INVENTION

Figure 1A:
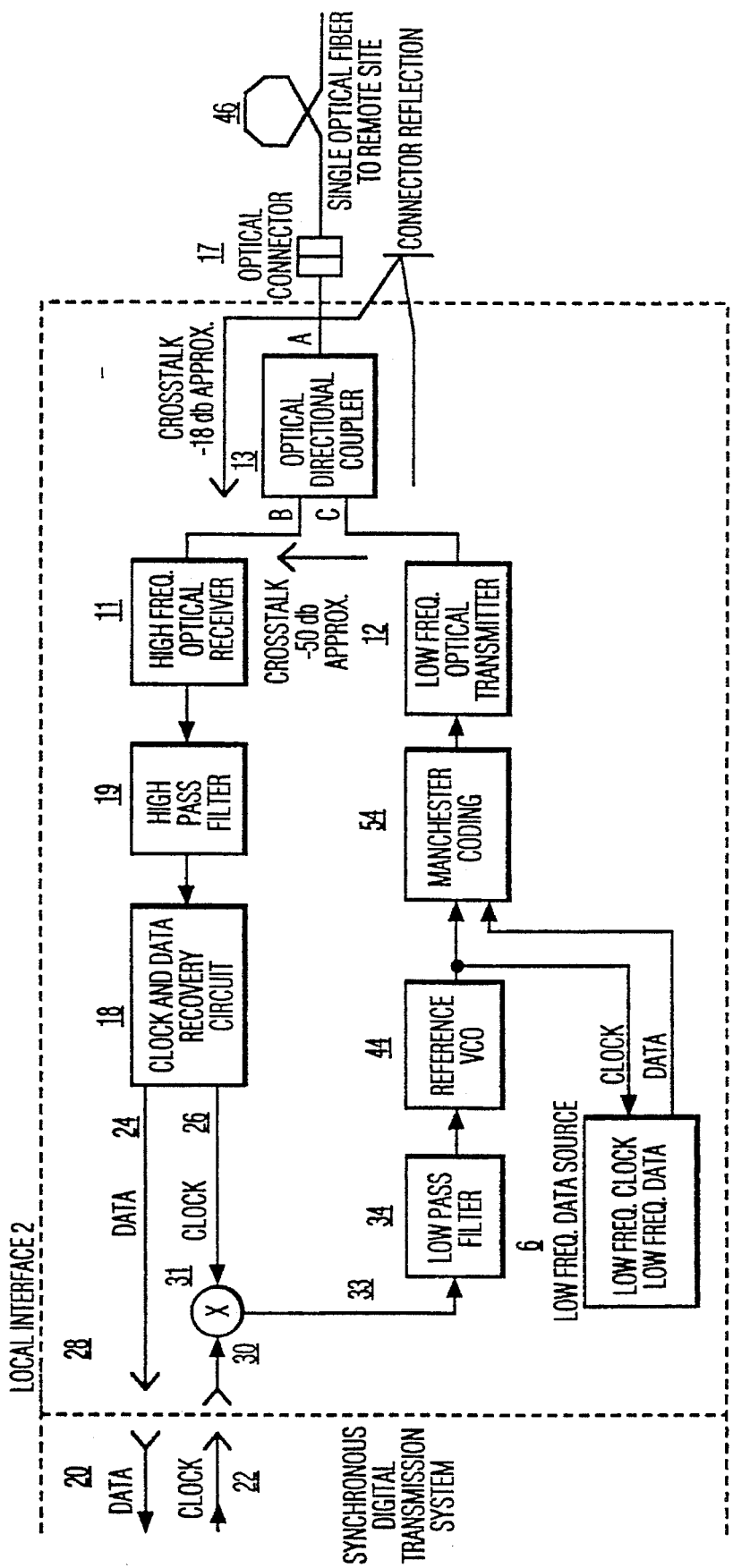
Figure 1B:
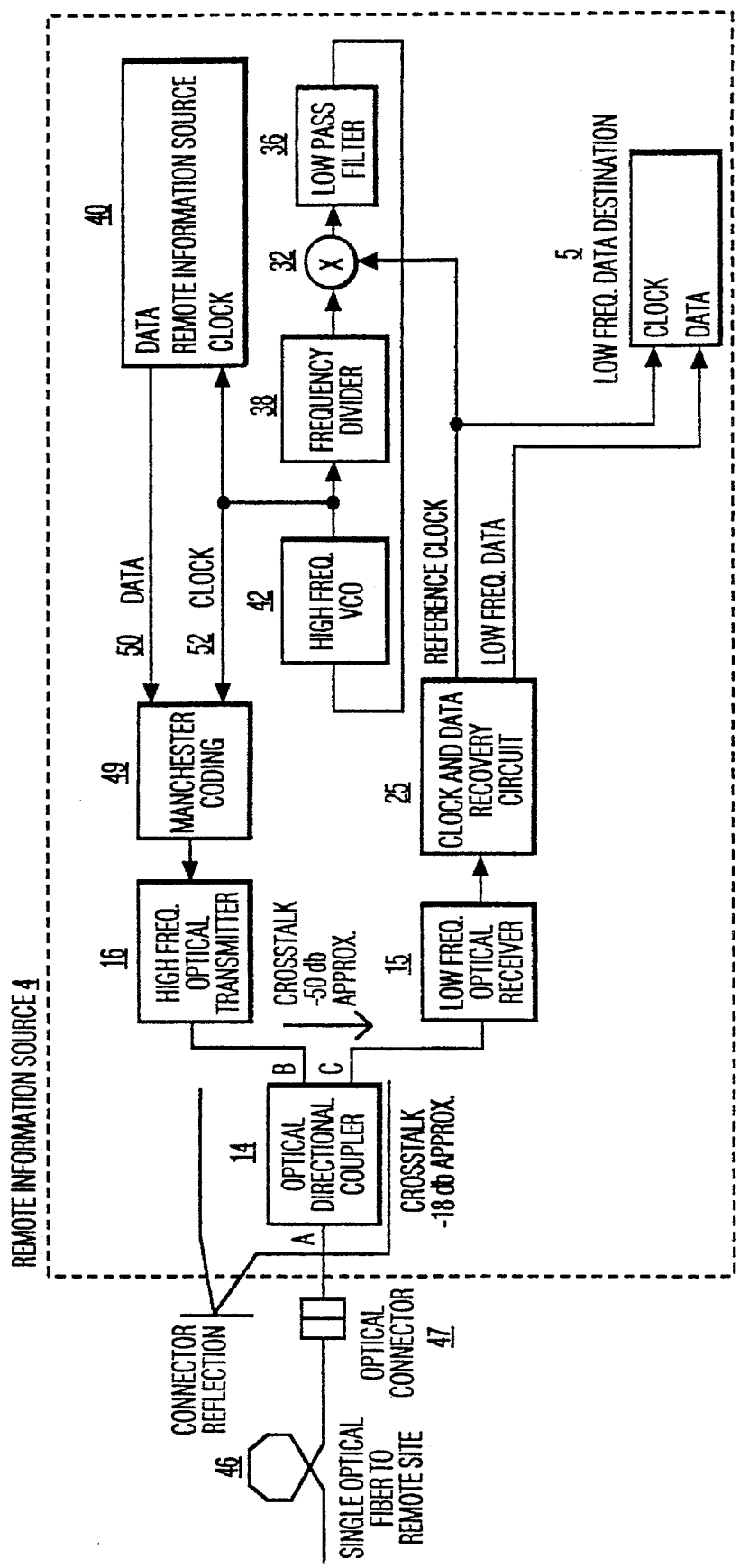

With reference to FIG. 1, a synchronous digital transmission system according to the present invention is shown comprising a local interface unit 2 electronically coupled to a data input terminal 20 and a system clock output terminal 22 of the local or principal system (not further shown). Unit 2 serves to develop low speed reference clock signals as described below and apply them to the remote information source or station 4 through an optical transmission medium and receive high speed data streams and apply them to the data input 20 of the local system.

Remote station 4, according to the invention, functions to receive the low speed reference clock signals, use them to generate a high speed clock signal and use the same to control the generation and transmission of high speed data streams back to the interface unit 2.

Communication is provided between interface unit 2 and remote station 4 through optical connectors 17 and 47 and a single optical fiber 46 that operates in a diplex mode in an exemplary manner described below.

It will be understood that only one remote station 4 is shown in the figure for simplicity, however, a plurality of remote stations may be provided each communicating with the local system over separate fiber links with a local interface unit 2. It will also be understood that the delay path in both directions provided by fiber 46 is variable by as much as several bits of a high bit rate because of temperature variations as described above.

Local interface unit 2 comprises an optical directional coupler 13 having an input A coupled to receive optical signals from connector 17, an input C coupled to receive optical signals from low frequency optical transmitter 12 and output B coupled to feed high speed data signals to high frequency optical receiver 11.

Receiver 11 converts the optical digital signals to electronic signals and applies them to high pass filter 19 which filters out any low frequency signal components appearing through crosstalk or reflection paths at receiver 11. A clock and data recovery circuit 18 separates these electronic signals, the high speed data signals appearing on lead 24 and port 28 and high speed clock signals appearing on lead 26.

A phase detector 31, low pass filter 34 and reference voltage controlled oscillator 44 (VCO) form a conventional phase-locked loop circuit. Accordingly, any phase error between the principal reference clock signals on lead 30 compared to the high speed clock signals on lead 26, will produce a voltage control signal on lead 33 that is proportional to such phase error. The phase of the reference VCO low frequency signal is controlled or adjusted in response to this phase error and reduces this error to zero as further described below.

The low speed reference clock signals are then applied to a coding circuit 54 having the capability of shaping the signal power-frequency spectrum so that the energy content of signals outside a narrow band near the low and high speed clock signal frequencies falls off rapidly. One such suitable coding circuit includes a Manchester coding circuit which has a spectral shape indicated in FIG. 2. The line coded reference clock signals are then converted to optical signals by low frequency optical transmitter and applied to the coupler 13.

The remote unit 4 includes a low speed optical receiver 15 coupled to receive the low speed optical signals from optical directional coupler 14 and to develop electronic low speed clock signals at the same rate as the reference VCO clock signals mentioned above. These reference clock signals are used to control the phase of the high frequency VCO 42 clock signals that runs at the same frequency as the high speed principal clock of the local system and that applies its output signals to the remote data generator 40 to control the timing of the remote information bit stream generation.

The phase of high speed clock signal VCO 42 output signals is controlled in the following manner. Phase detector 32, low pass filter 36, high frequency VCO and frequency divider form a phase—locked loop circuit. Phase detector 32 senses the reference clock signal from receiver 15 and recovery circuit 25 and the output from frequency divider 38 that produces the same clock signal frequency as the reference signal but at the phase produced by VCO 42. The output from detector 32 represents the phase error between its clock signal inputs. The phase error signal is fed to low pass filter 36 and fed back to control the phase of the high frequency clock signal VCO 42. Therefore the phase of the output high speed data bit stream from unit 40 is controlled by the phase of the reference clock signals that just arrived from the variable delay path, namely fiber 46.

Figure 2:
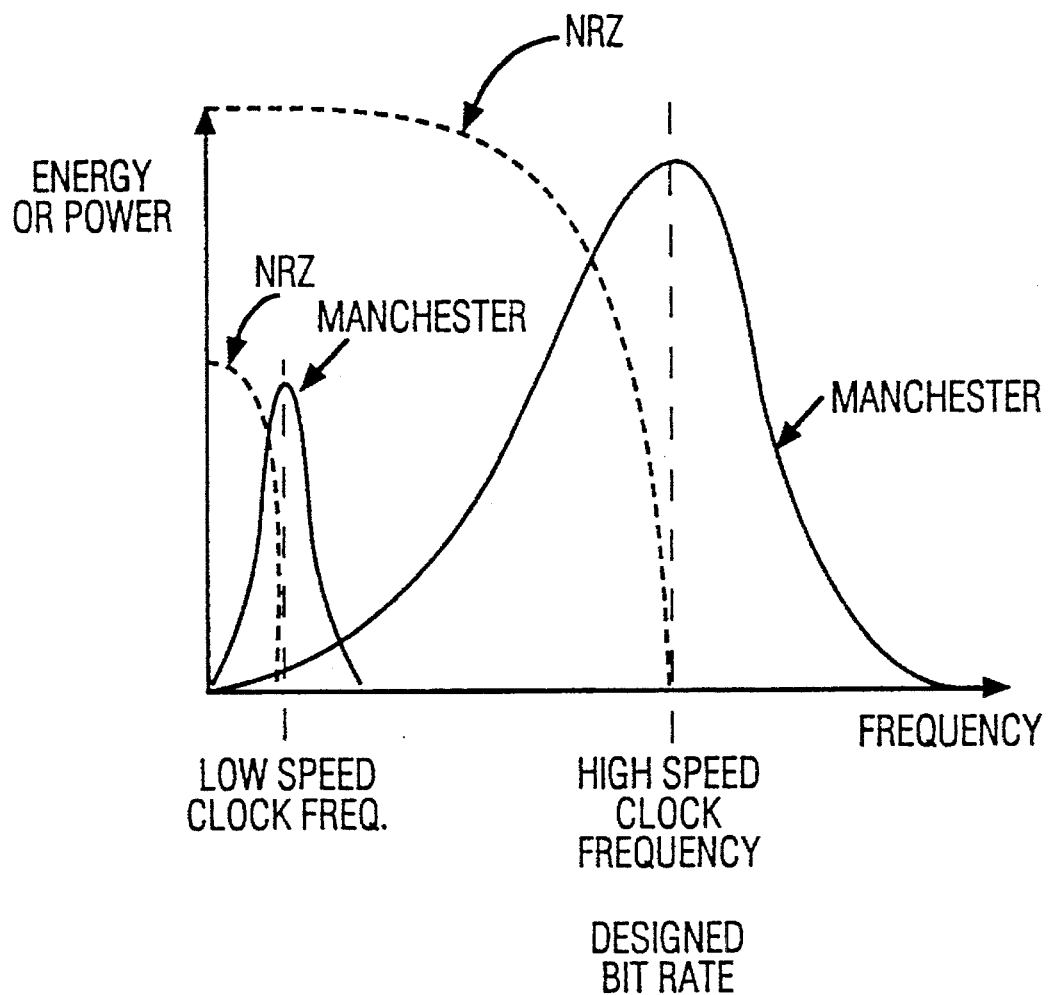

Both the high speed data and high frequency clock signals are applied to leads 50 and 52 respectively and to a high speed Manchester coding 49 circuit for power-frequency spectral shaping (see FIG. 2). Coded signals are then applied to a high frequency optical transmitter 16 for conversion to an optical signals bit stream and applied to port B of optical directional coupler 14 for transmission through variable delay path fiber 46 to local unit 2.

The harmful effects of using bidirection optical digital transmission through a single fiber and using optical couplers 13 and 14 in the system of FIG. 1 are avoided or minimized by selecting non-standard line coding schemes for the operating ranges of the information data bit rate and the various low and high speed clock frequencies. These codes should have the characteristics of having low energy components in areas outside their designed frequency of primary operation for reasons given above.

FIG. 2 depicts one such useable optical line coding scheme, namely, the use of Manchester codes for the low and high clock frequencies. Note the power or energy content of the respective signals are low away from the respective clock frequency or designed information bit rate and therefore can be easily filtered out or otherwise have little effect on the signal to noise ratio or information degradation. For example, the effects of high frequency crosstalk or reflections appearing at receiver 15 of unit 4 may be ignored because of their low energy content and the frequency spectrum of the low frequency signals processed through the recovery circuit 25.

In the event it is desired to generate a data bit stream at the local or interface unit 2 for transmission to and use by the remote unit (such as sending camera control information to a remote video camera), a low speed data source 6 can be provided that generates data under control of the reference VCO. The low speed data bits are coded by the coding circuit 54 and become part of the optical signals emitted by transmitter 12. Reference clock and low speed data signals are separated by recovery circuit 25 with the low speed data applied to destination circuit 5 that is also controlled by reference clock signals from circuit 25.

In one example of the present embodiment, the high speed data rate is 200 Mbit per second with a principal frequency and high frequency clock signals of 200 MHz and the reference frequency clock signals at 10 MHz. If the low speed channel is used, the bit rate is 10 MBits per second.

It will be appreciated that various modifications can be made to the system and method of the embodiments disclosed herein and that thee inventive concepts hereof can be applied in a great variety of synchronous digital optical systems without departing from the spirit and scope of the present invention.

We claim:

1. A synchronous optical digital transmission system for a local principal system comprising,
   a. a local interface unit for receiving from the local system high speed principal clock signals and for applying to the local system a high speed digital data bit stream received from a remote unit in timed relation with said principal clock signals,
   b. a remote unit including means for generating said high speed digital data bit stream, and
   c. optical transmission means for transmitting data bit streams and clock signals in both directions between said local unit and said remote unit, said transmission means having the same variable delay length for all signals transmitted therethrough in both directions, and
   d. wherein said local unit includes first generating means for producing for transmission through said transmission means low speed reference clock signals in phase relation with the high speed principal clock signals and high speed remote clock signals received from the remote unit, and
   e. wherein said remote unit includes second generating means for producing, in relation to the received low speed reference clock signals, high speed remote clock signals for timing the high speed data bit stream generated by said remote unit, such that the high speed data bit stream upon arrival at the local unit is timed in phase relation to the high speed principal clock signals.

2. A transmission system according to claim 1, wherein said first generating means includes a reference clock signal generator and a control circuit for adjusting the phase of said reference clock signal generator output in relation to the difference between the phase of such high speed remote clock signals arriving at said interface unit and the phase of the principal clock signals.

3. A transmission system according to claim 2, wherein said second generating means includes a remote clock signal generator and a second control circuit for sensing the arriving reference clock signals and controlling the phase of the remote clock signals produced by said remote clock signal generator.

4. A transmission system according to claim 3, wherein said reference clock signal generator produces low speed clock signals in phase relation to the principal clock signals and said remote clock signal generator produces high speed clock signals in phase relation to said low speed clock signals, said high speed clock signals being at the same rate as the high speed principal signals.

5. A transmission system according to claim 4, wherein said local interface unit further includes third generating means for generating low speed data signals under the control of said low speed reference clock signals and applying said low speed data signals to said transmission means, and said remote unit includes means for receiving and using said low speed data signals under the control of the arriving low speed reference clock signals.

6. A transmission system according to claim 4,
   wherein said local interface unit and said remote unit comprises first and second conversion means to convert electronic signals to and from corresponding optical signals for transmission over and reception from said optical transmission means.

7. A transmission system according to claim 6, wherein said first conversion means at said interface unit includes a high frequency optical receiver for generating high speed data signals and said remote clock signals, a low frequency optical transmitter for generating said reference clock signals and first optical coupling means for coupling said high speed data signals to the interface unit output and for coupling the high speed clock signals to said control circuit and for coupling said reference clock signals to said transmission means, and second conversion means at said remote unit includes a low frequency optical receiver for generating the reference clock signals for application to said second control circuit, and a high frequency optical transmitter for generating optical signals corresponding to signals from said remote clock signal generator and second optical coupling means for coupling the reference clock signals from said transmission means to the low frequency receiver and the remote clock signals and high speed data signals to the said transmission means.

8. A transmission system according to claim 1,
   wherein said transmission means comprises not more than one single optical fiber.

9. A transmission system according to claim 8, wherein said remote unit further comprises line coding means for coding said data bit stream with a Manchester coded power-frequency spectral characteristic with a predetermined first center frequency and wherein said local interface unit comprises second line coding means for coding said reference clock signals with a Manchester coded power-frequency spectral characteristic with a predetermined second center frequency.

10. A synchronous optical digital transmission system comprising:
   a. a local interface unit for a local data processing system for receiving principal clock signals from the local system and for coupling to the local data processing system a high speed digital data bit stream generated at a remote unit,
   b. a remote unit for generating the high speed digital data bit stream,
   c. a single optical fiber coupled between the local and remote units for transmitting optical signals simultaneously in both directions between said units,
   wherein said remote unit further comprises line coding means for coding said data bit stream with a coded Manchester power-frequency spectral characteristic with a predetermined first center frequency, and
   wherein said interface unit includes means for generating a low speed data bit stream for transmission through said optical fiber and second coding means for coding said low speed data bit stream with a coded Manchester power-frequency spectral characteristic with a predetermined second center frequency.

11. A system according to claim 10, wherein said second center frequency is sufficiently below said first center frequency so that noise from the high speed and low speed data bit streams do not adversely affect the informational content represented by said bit streams.

* * * * *